United States Patent [19]

Tsujihara et al.

[11] Patent Number: 5,200,815
[45] Date of Patent: Apr. 6, 1993

[54] CONVERGENCE CORRECTION APPARATUS FOR A VIDEO PROJECTION SYSTEM

[75] Inventors: Susumu Tsujihara, Neyagawa; Yasuaki Sakanishi, Ibaraki, both of Japan

[73] Assignee: Matsushita Electric Industrial Co., Ltd., Osaka, Japan

[21] Appl. No.: 709,301

[22] Filed: Jun. 3, 1991

[30] Foreign Application Priority Data

Jun. 7, 1990 [JP] Japan ................................ 2-148989

[51] Int. Cl.⁵ .......................................... H04N 9/31
[52] U.S. Cl. .................................... 358/60; 358/64; 358/10; 315/368.13
[58] Field of Search .................. 358/60-64, 358/231, 237, 10, 29; 315/368.13

[56] References Cited

U.S. PATENT DOCUMENTS

| | | | |
|---|---|---|---|
| 4,754,204 | 6/1988 | Ando | 358/11 |
| 4,816,908 | 3/1989 | Colineau | 358/60 |
| 4,835,602 | 5/1989 | Duwaer | 358/60 |
| 4,999,703 | 3/1991 | Henderson | 358/10 |

FOREIGN PATENT DOCUMENTS 55-61552  5/1980  Japan.
59-8114   2/1984  Japan.

Primary Examiner—Victor R. Kostak
Assistant Examiner—Sherrie Hsia
Attorney, Agent, or Firm—Stevens, Davis, Miller & Mosher

[57] ABSTRACT

An image correction apparatus in which adjustment of a projector unit for widening projection with a plurality of projector tubes can be eliminated by setting specifications of the projecting optical system and by automatically calculating converging angles at which images of light of respective colors are formed on a screen, so as to automatically compute various correction data for geometrical distortion, luminance reduction and focus error.

10 Claims, 19 Drawing Sheets

FIG. 13(a)
| CORRECTION WAVEFORMS | CONVERGENCE COIL | CORRECTION CHANGE |
|---|---|---|
| (1) VERTICAL SAWTOOTH WAVE 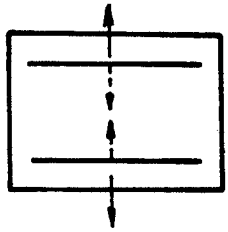 | VERTICAL | VERTICAL AMPLITUDE 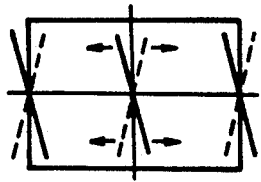 |
| | HORIZONTAL | ORTHOGONAL CORRECTION (LONGITUDINAL) 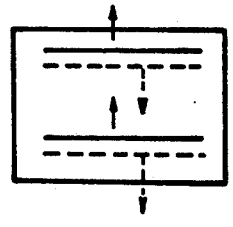 |
| (2) VERTICAL PARABOLIC WAVE 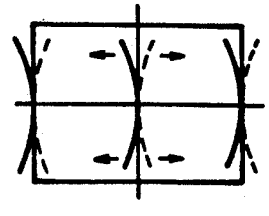 | VERTICAL | VERTICAL LINEARITY |
| | HORIZONTAL | LONGITUDINAL CURVE CORRECTION |

FIG. 13(b)
| CORRECTION WAVEFORMS | CONVERGENCE COIL | CORRECTION CHANGE |
|---|---|---|
| (3) HORIZONTAL SAWTOOTH WAVE 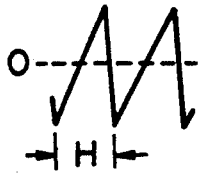 | VERTICAL | ORTHOGONAL CORRECTION (LATERAL) 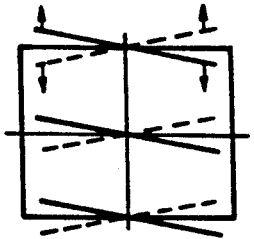 |
| | HORIZONTAL | HORIZONTAL AMPLITUDE 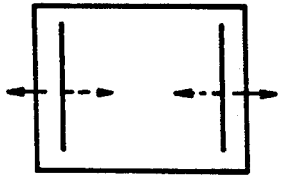 |
| (4) VERTICAL PARABOLIC WAVE 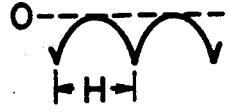 | VERTICAL | LATERAL CURVE CORRECTION 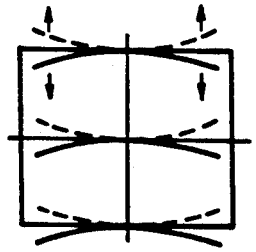 |
| | HORIZONTAL | HORIZONTAL LINEARITY 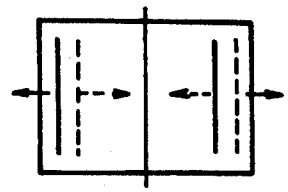 |

FIG. 16(a)
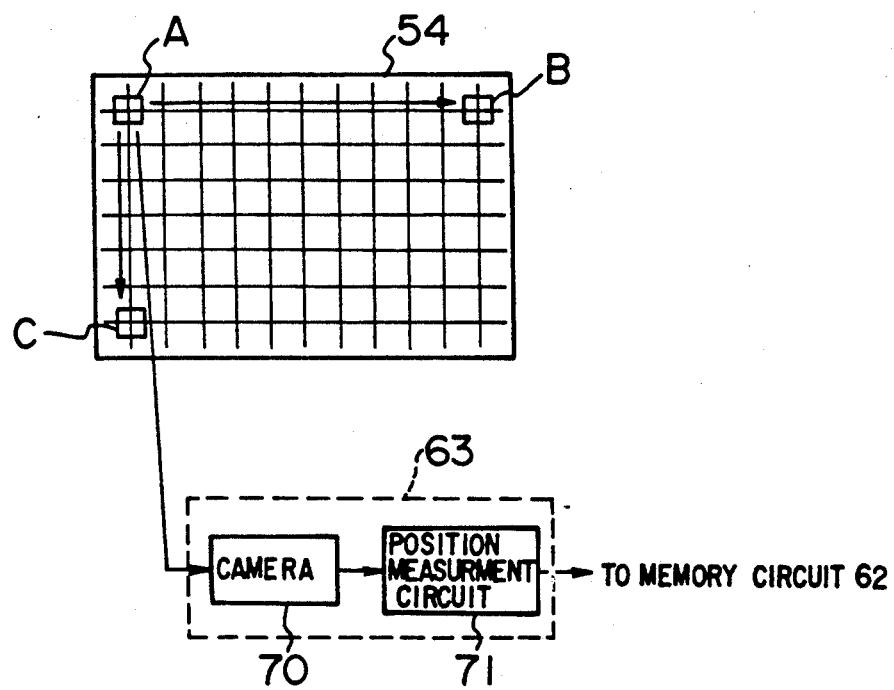
FIG. 16(b)
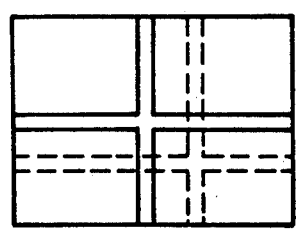
FIG. 16(c)
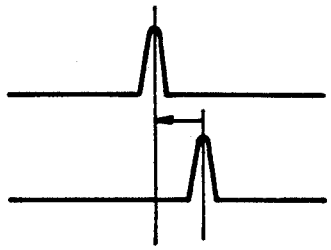
FIG. 16(d)

CONVERGENCE CORRECTION APPARATUS FOR A VIDEO PROJECTION SYSTEM

BACKGROUND OF THE INVENTION

1. Field of the Invention

The present invention relates to an apparatus for digital correction which is for use in a color television receiver set and more particularly to a digital image correction apparatus which can automatically perform various kinds of image corrections.

2. Description of the Prior Art

In a video projector which performs widening projection on the screen by using three projector tubes for emitting light of three primary colors, incident angles, upon the screen, of light from the projector tubes (hereinafter referred to as converging angles) are in general different from each other, causing such defects as color aberration, focus error, deflection distortion and luminance change on the screen. Various corrections of these defects are effected by adjusting the magnitude and shape of analog correction waveforms which are in synchronism with the horizontal and vertical scanning periods but such a method suffers from poor correction accuracy. In addition, shifts on the screen are visually observed to make various corrections manually and disadvantageously the adjustment is time-consuming. Under the circumstances, a digital convergence apparatus capable of effecting highly accurate convergence as disclosed in JP-B-59-8114 has been proposed and digital convergence as disclosed in JP-A-55-61552 has also been proposed for automatic correction.

A conventional image correction apparatus will now be described. The conventional image correction apparatus is illustrated, in block form, in FIG. 18. In a video projector comprised of a projection display 47 and a screen 54, convergence correction circuit 1, luminance correction circuit 2, focus correction circuit 3 and deflection linearity correction circuit 4 are corrected by displaying on the screen pattern signals suitable for various corrections and which are generated from a pattern generator 7, visually extracting shift amounts and change amounts from the displayed pattern signals to provide correction data, and manually operating a manual adjuster 5 in accordance with the correction data.

Since in this manner various corrections are effected manually through visual observation, various image corrections can be effected with high accuracies.

With the conventional image correction apparatus having the above construction, however, various kinds of correction data for color aberration, focus error, deflection distortion and luminance change at individual adjustment points must be input, raising a problem that the adjustment is very time-consuming.

SUMMARY OF THE INVENTION

The present invention contemplates elimination of the above problem and it is an object of the invention to provide an image correction apparatus of video projector which can reduce the time for adjustment greatly by setting specifications of a projecting optical system, calculating converging angles of individual projector tubes from convergence correction amounts and automatically determining, on the basis of the calculated data, correction data for deflection linearity, luminance and focusing through computation.

To accomplish the above object, according to one aspect, the invention comprises display means for widening projecting and displaying images on a screen by using a plurality of projector tubes, means for setting specifications of the projecting optical system of the display means, and means for determining various correction amounts through computation in accordance with data for converging angles of the plurality of projector tubes produced from the setting means.

According to another aspect, the invention comprises means for generating test signals on the screen for convergence adjustment, means for detecting convergence shift amounts on the screen, means for calculating converging angles from convergence correction amounts, and means for determining various correction amounts from calculated data through computation.

According to still another aspect, the invention comprises means for preparing convergence correction data by displaying pattern signals for detection, extracting from the pattern signals shift amounts at a plurality of adjustment points on the screen and digitally storing and interpolating correction data at individual adjustment points, means for calculating converging angles from the convergence correction amounts, and means for determining various correction amounts from calculated data through computation.

With the above construction, the converging angle standing for the basic specification of the projecting optics is set, converging angles of a plurality of projector tubes are calculated from convergence correction amounts, correction amounts for deflection linearity, luminance reduction and focus error are determined from the calculated data by computing and individual correction means are corrected automatically in accordance with the computed data, thereby making it possible to eliminate various complicated adjustments. In addition, since the converging angle can be calculated easily by detecting color aberration at only the crucial line and peripheral portion of the screen, the apparatus can be realized with a circuit of simplified scale.

Further, with the above construction, by detecting and automatically correcting color aberration amounts on the screen and determining various correction amounts from the corrected color aberration amounts by computing, the time for adjustment can be reduced to a great extent. Furthermore, by detecting the geometrical shift amount relative to light from the reference projector tube, the converging angle can be calculated easily and an apparatus of a simplified construction can be realized.

Furthermore, by displaying pattern signals for detection, extracting from the pattern signals shift amounts at a plurality of adjustment points on the screen, digitally storing and interpolating correction data for individual adjustment points to determine convergence correction amounts, and calculating converging angles from the convergence correction amounts to determine various kinds of correction data through computation, complicated adjustments of the video projector can be eliminated and so the time for adjustment can be reduced.

BRIEF DESCRIPTION OF THE DRAWINGS

FIGS. 13 (a) and (b) show correction waveforms and correction changes in the second embodiment;

FIGS. 16 (a) through (d) show a block diagram of an arrangement used for convergence correction and diagrams useful to explain the operation thereof in the third embodiment;

DESCRIPTION OF THE PREFERRED EMBODIMENTS

Figure 1:
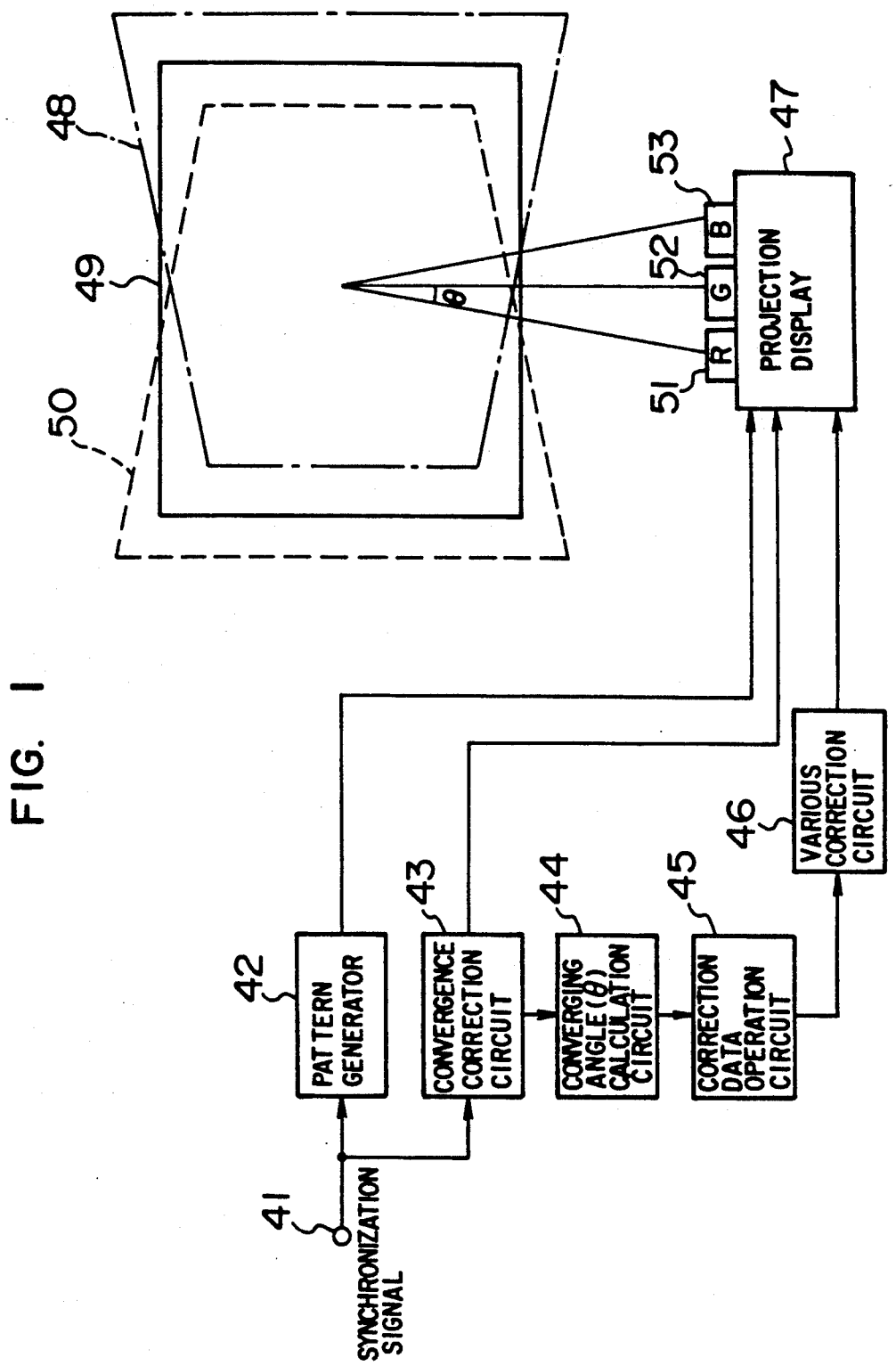
FIG. 1 is a block diagram showing a first embodiment of an image correction apparatus according to the invention.
Figure 2:
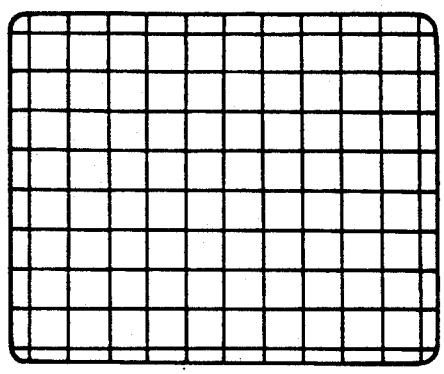
FIG. 2 is a diagram showing a picture displayed on the screen useful to explain the operation of the first embodiment.

Preferred embodiments of the invention will now be described with reference to the accompanying drawings. FIG. 1 is a block diagram showing a first embodiment of an image correction apparatus of the invention and FIG. 2 is a diagram showing a picture displayed on the screen. Referring to FIG. 1, reference numeral 41 designates an input terminal to which a synchronization signal is supplied, 42 a pattern generator for generating pattern signals in synchronism with the synchronization signal from the input terminal 41, 43 a convergence correction circuit for preparing various convergence correction waveforms from the synchronization signal, 47 a projection display for projecting light of three primary colors from projector tubes onto the screen through lenses 51 to 53, 44 a converging angle calculation circuit for calculating converging angles $\theta$ incident upon the screen on the basis of convergence correction amounts displayed on the screen, correction data operation circuit for determining, through automatic computation, various correction waveforms from calculated data of the converging angles and 46 a circuit for various corrections adapted to make various kinds of corrections on the basis of computed data.

The operation of the image correction apparatus of the present embodiment constructed as above will now be described. When a synchronization signal is applied to the input terminal 41, the pattern generator 42 generates address signals in association with each horizontal scanning so that a cross-hatch pattern having, for example, 11 columns in the horizontal direction and 9 rows in the vertical direction as shown in FIG. 2 may be displayed on the screen. The synchronization signal is also supplied to the convergence correction circuit 43, causing the same to prepare correction waveforms (such as parabolic waveform and sawtooth waveform) in association with each horizontal scanning the correction waveforms which are supplied for correction to a convergence yoke through a convergence amplifier included in the projection display 47. In the projection display 47 using a plurality of projector tubes, light sources of RGB are aligned in line and consequently display regions on the screen are different for the individual colors. Light from the R projecting optics 51 corresponds to a display region 50 on the screen, light from the G projecting optics 52 corresponds to a display region 49 on the screen and light from the B projecting optics 53 corresponds to a display region 48 on the screen. This signifies that the convergence correction amounts are roughly determined in accordance with the arrangement of the projecting optical system. Accordingly, a projecting optical system can be designed on the basis of correction data produced from the convergence correction circuit 43. The correction data from the convergence correction circuit 43 is supplied to the converging angle ($\theta$) calculation circuit 44, causing the same to calculate converging angles of light incident upon the screen from the respective light sources. Calculated data from the converging angle ($\theta$) calculation circuit 44 is supplied to the correction data operation circuit 45 which in turn determines various kinds of correction data by computing. The correction data is determined by not only the converging angle ($\theta$) but also the curvature of the phosphor screen of the projector tube, the curvature of the display screen and the specification of the projecting lens. The thus computed correction data includes, in the first place, data for correction of deflection linearity necessary to obtain uniformity of positioning of each display region of each color over the entire screen, in the second place, data for correction of luminance reduction necessary to obtain uniformity of luminance (brightness) of each display region of each color over the entire screen and in the third place, data for correction of focus error necessary to obtain unformity of focusing (resolution) of each display region of each color over the entire screen. The correction data from the correction data operation circuit 45 are supplied to the circuit 46 for various corrections which in turn corrects the deflection linearity, luminance reduction and focus error. Correction data from the various-correction circuit 46 are supplied to various correction circuits in the widening projector 47 to complete various kinds of correction.

Figure 3A:
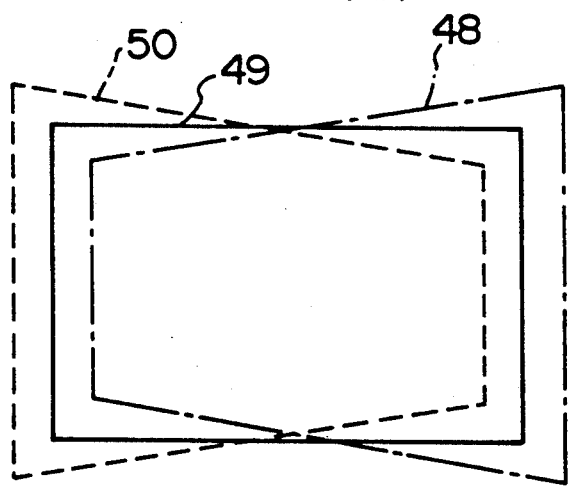
FIGS. 3 (a) and (b) show the construction of an optical system used in the first embodiment.
Figure 3B:
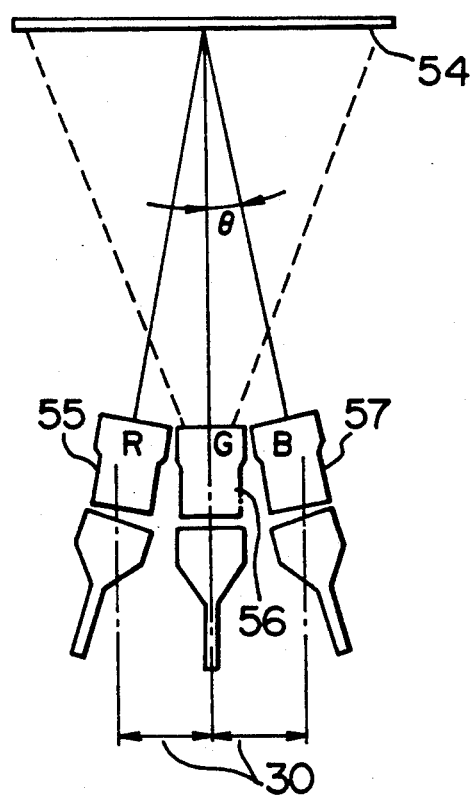
Figure 4A:
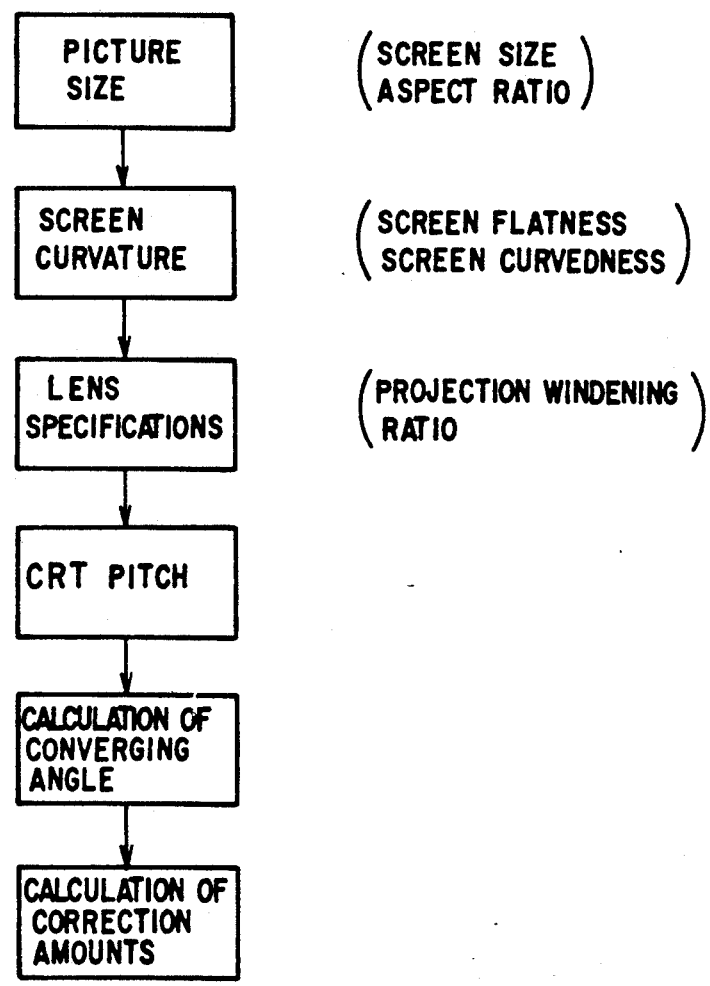
FIG. 4 (a) illustrates a flow chart of a program for calculation of convergence correction amounts in the above embodiment and FIG. 4 (b) illustrates a diagram useful to explain the flow chart.
Figure 4B:
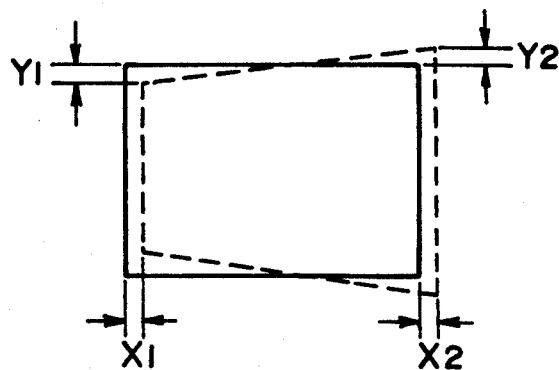

The operation of the converging angle ($\theta$) calculation circuit 44 will now be described in greater detail with reference to FIG. 3, which is being illustrative of the optics construction at sections (a) and (b), and FIG. 4, which is illustrative of the flow of a calculation program at sections (a) and (b). In the case of a projecting optical system as shown at section (b) in FIG. 3, respective projecting optics (projector tubes and lenses) 55 to 57 of respective colors correspond to display regions 48 to 50 of respective colors on a screen 54, as shown at section (a) in FIG. 3. This is due to a converging angle ($\theta$) determined by the optics. In the R projecting optics 55, the projecting distance to the right edge of the screen 54 is longer to increase the widening ratio for the right edge and accordingly the optics 55 corresponds to the display region 48; conversely, in the B projecting optics 57, the projecting distance to the right edge of the screen 54 is shorter to decrease the widening ratio for the right edge and accordingly the optics 57 corresponds to the display region 50. In the G projecting optics 56 centrally positioned, the right and left edges of the screen is symmetrical with respect to the axis of the optics 56 and accordingly the optics 56 corresponds to the display region 49.

Figure 5:
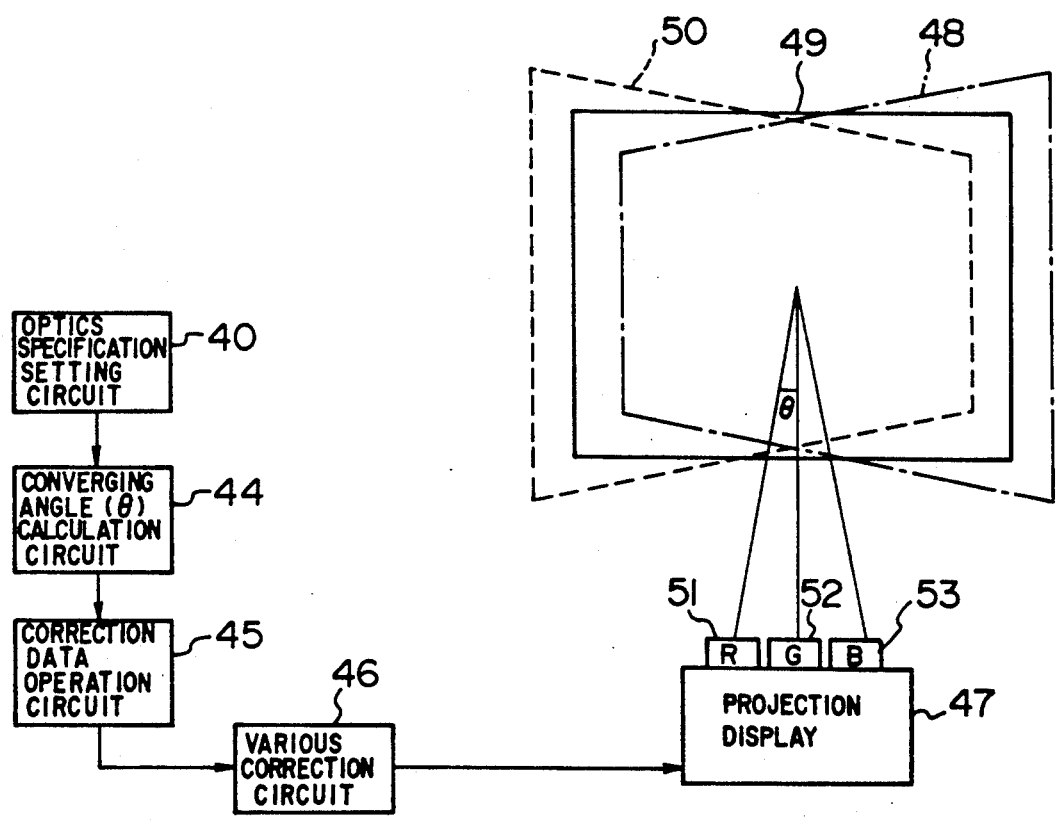
FIG. 5 is a block diagram useful to explain the first embodiment.

To explain how to calculate the converging angle, reference should also be made to a diagram of FIG. 5. In an optics specification setting circuit 40 of FIG. 5, as shown in a flow chart of a calculation program illustrated at (a) in FIG. 4, the picture size such as screen size and aspect ratio is set firstly, the screen curvature such as screen flatness and screen curvedness is set secondly, the lens specification such as projection widening ratio and projecting distance is set thirdly and the pitch between CRT's aligned in line is set fourthly; and a converging angle ($\theta$) of each projecting optics is calculated in accordance with the contents of the above setting operations. In accordance with the thus calculated converging angles, convergence shift amounts X1, X2 and Y1, Y2 as shown at (b) in FIG. 4 can be calculated automatically. In this manner, the converging angles can be calculated from the convergence correction amounts to complete calculation of all items of the specification of the projecting optical system. Namely, by setting various specification items of the optics, the converging angle can be calculated automatically.

Figure 6:
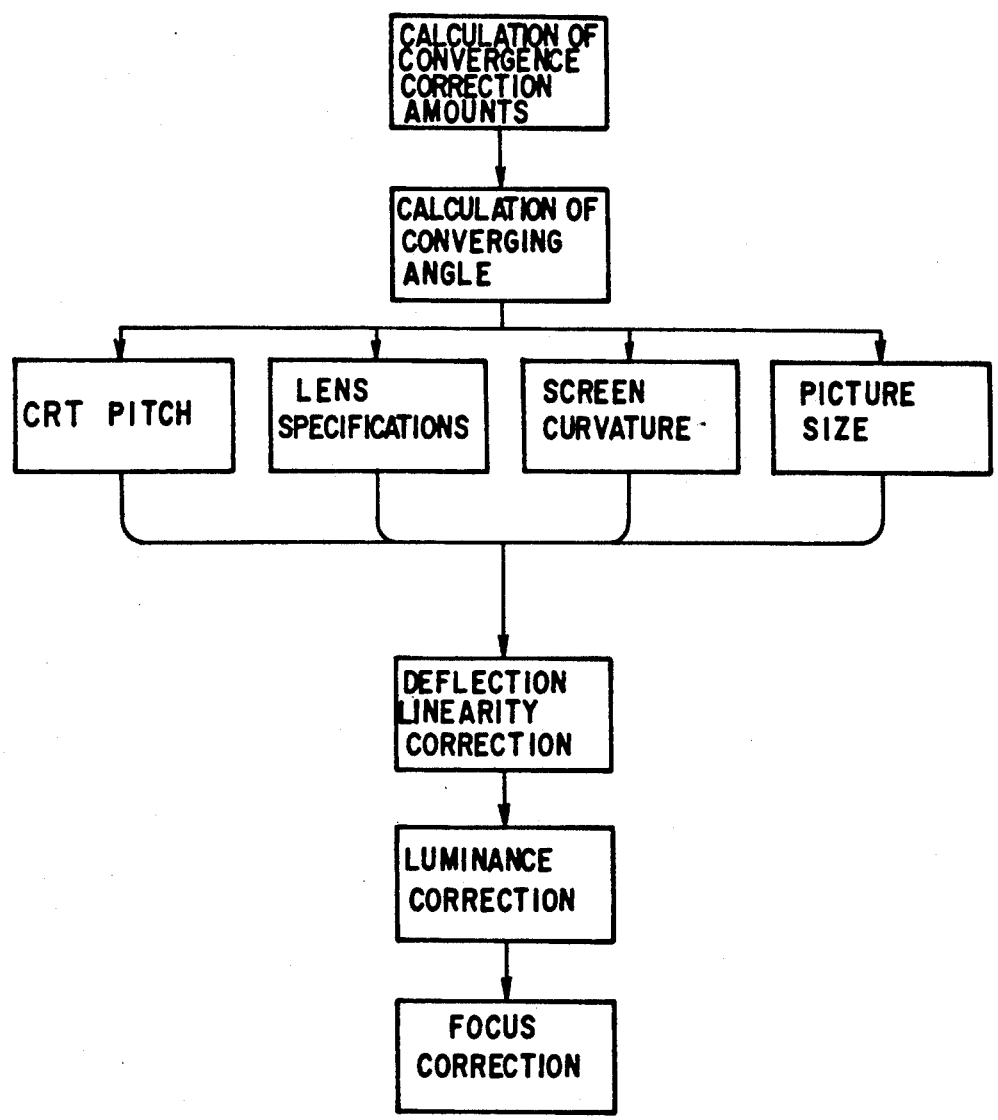
FIG. 6 is a flow chart of a program for calculation of various kinds of correction data in the first embodiment.

The operation of the converging angle calculation circuit 45 and correction data operation circuit 45 will be described in greater detail with reference to a program flow chart of FIG. 6. Firstly, pattern signals of respective colors displayed on the screen are observed to correct convergence by means of the convergence correction circuit 43. Secondly, the convergence angle of the optics is calculated on the basis of the correction data for each horizontal scanning. Thirdly, various kinds of data of specification of the optics such as CRT pitch, lens specifications screen curvature and picture size are inputted in advance. In accordance with the converging angle and various kinds of specification data of the optics, deflection linearity data, luminance correction data and focus correction data can be calculated automatically and correction can be carried out.

Figure 7A:
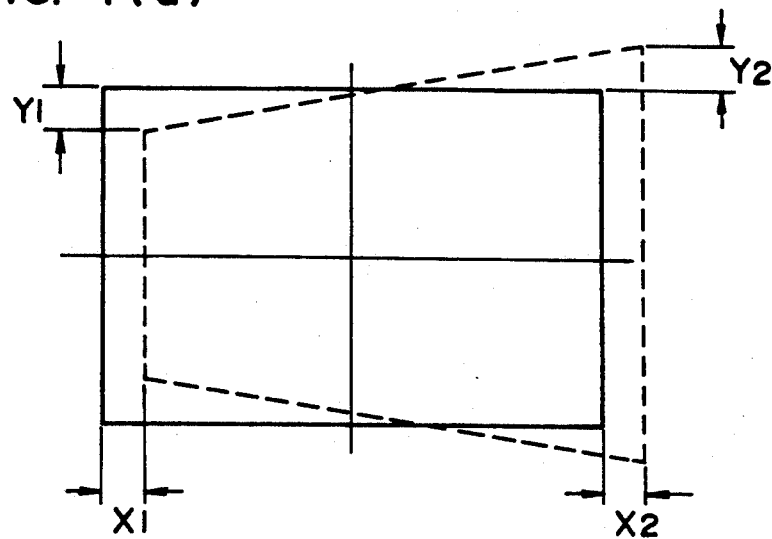
FIGS. 7 (a) through (c) illustrate a picture displayed on the screen, waveforms and correction points useful to explain the first embodiment.
Figure 7B:
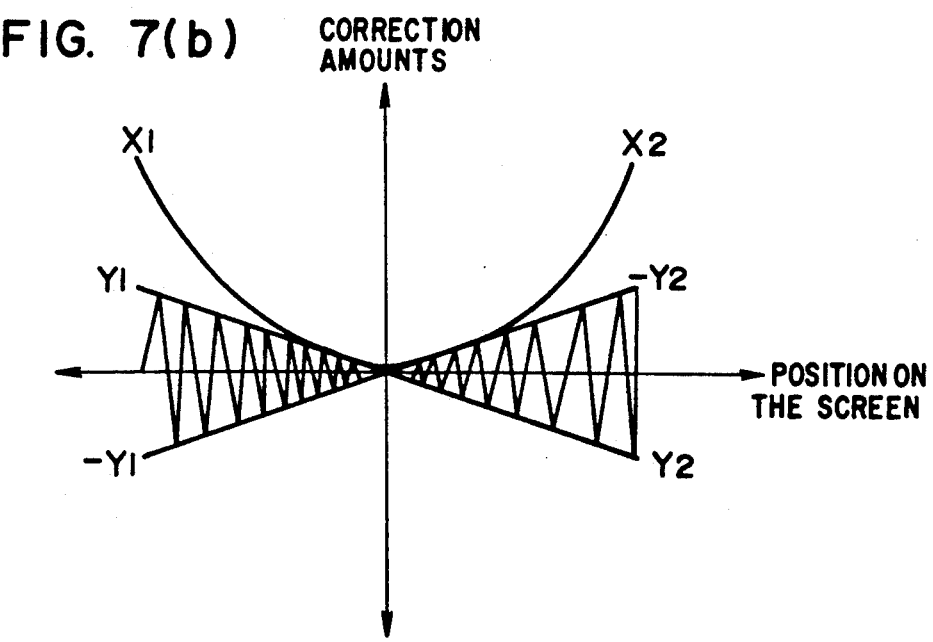
Figure 7C:
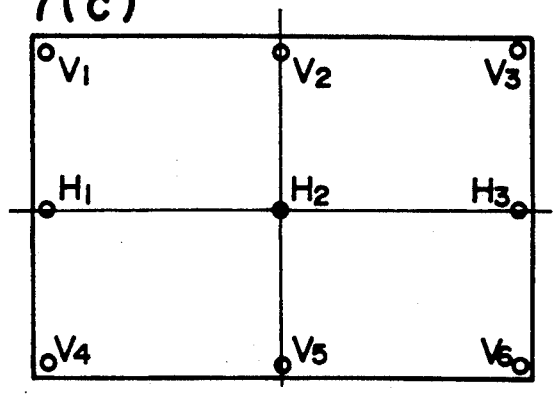
Figure 8A:
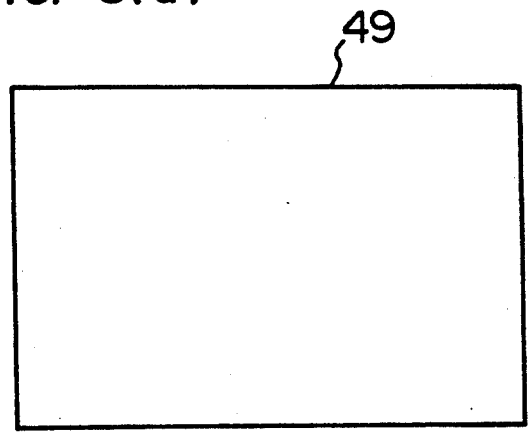
FIGS. 8 (a) through (d) show the construction of the optical system useful to explain the operation of the first embodiment.
Figure 8B:
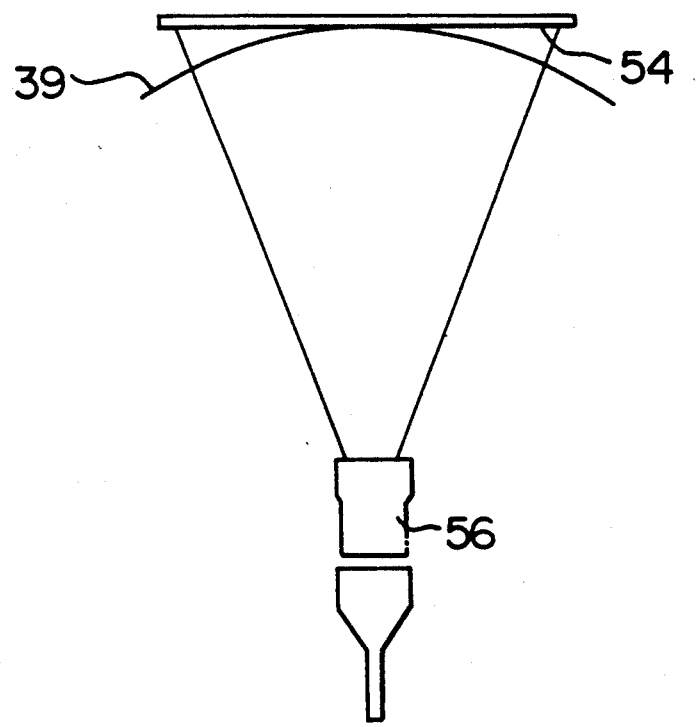
Figure 8C:
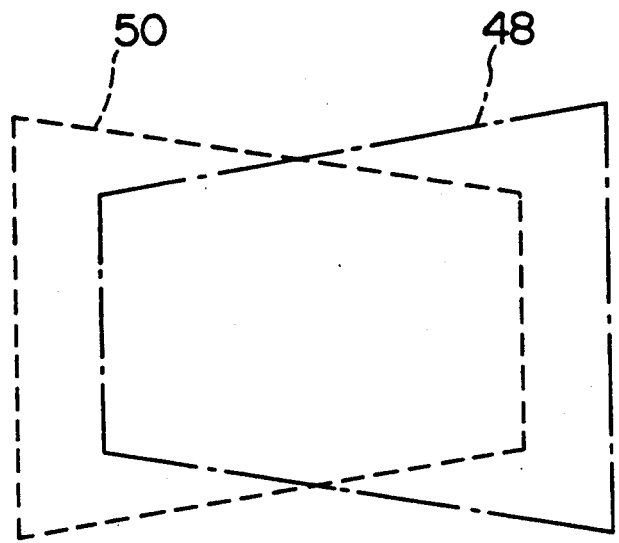
Figure 8D:
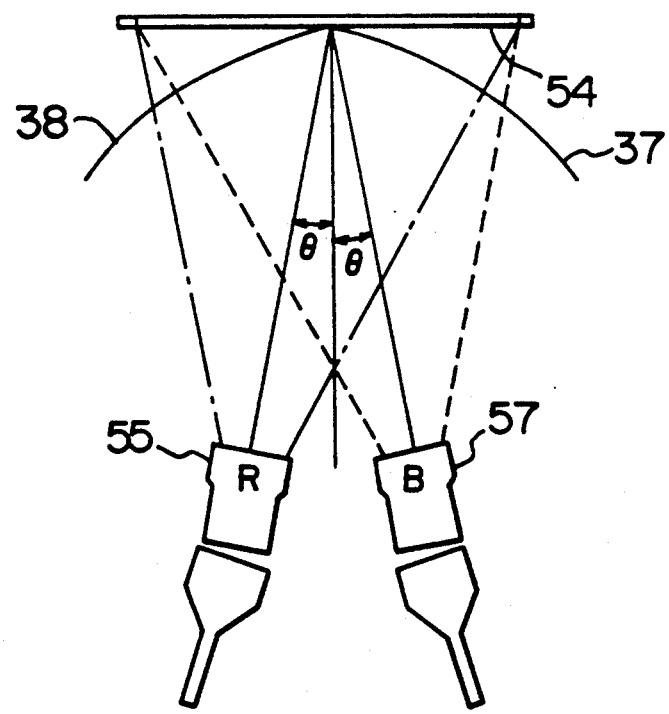

To explain how to calculate the converging angle from the convergence correction amount in greater detail, reference should also be made to FIG. 7 showing the display screen and waveforms. FIG. 7 illustrates at section (a) geometrical shift amounts of convergence on the display screen and it shows at section (b) correction waveforms for correction of the geometrical shift amounts, each waveform being depicted as a function of position on the screen. Specifically, the waveform for correction of horizontal shifts X1 and X2 is a parabolic waveform, the waveform for correction of vertical shifts Y1 and Y2 on the upper portion of the screen is a sawtooth waveform, and the waveform for correction of vertical shifts $-Y1$ and $-Y2$ on the lower portion is a sawtooth waveform which is obtained by inverting the polarity of the former sawtooth waveform and which is symmetrical with the former sawtooth waveform with respect to the center axis of the screen. Therefore, in order to calculate the convergence correction amounts in the horizontal direction, correction amounts at points H1, H2 and H3 on the horizontal line may be calculated. In order to calculate the convergence correction amounts in the vertical direction, correction amounts at points V1 to V6 on the vertical lines may be calculated. Namely, correction amounts for each horizontal scanning can be calculated from correction amounts on the crucial line and corners of the screen. The projection display 47 determines convergence correction sensitivity such as amplification degree of correction current of the convergence yoke and therefore it always has constant relationship with the aforementioned correction amounts. Accordingly, the converging angles representative of the basic specification of the projecting optical system can be calculated from the correction amounts on the crucial line and corners of the screen.

To explain how to calculate various kinds of correction data from the converging angle in greater detail, reference should also be made to FIG. 8, illustrative of the construction of optics. The basic optical system of the video projector is divided into the central G projecting optics 56 as shown at (b) in FIG. 8 and the side R projecting optics 55 and side B projecting optics 57 as shown at (d) in FIG. 8 which adjoin the central optics 56. The G raster 49 produced by the G projecting optics 56 shown at (b) in FIG. 8 is illustrated at (a) in FIG. 8, and the R raster 48 and B raster 50 respectively produced by the R projecting optics 55 and B projecting optics 57 shown at (d) in FIG. 8 are illustrated at (c) in FIG. 8. The G raster 49 is essentially rectangular as shown at (a) in FIG. 8 but the R raster 48 and B raster 50 are trapezoidal as shown at (c) in FIG. 8 because of the presence of the converging angle ($\theta$) determined by the projecting optical system as described previously.

Figures 9A, 9B, 9C, 9D:
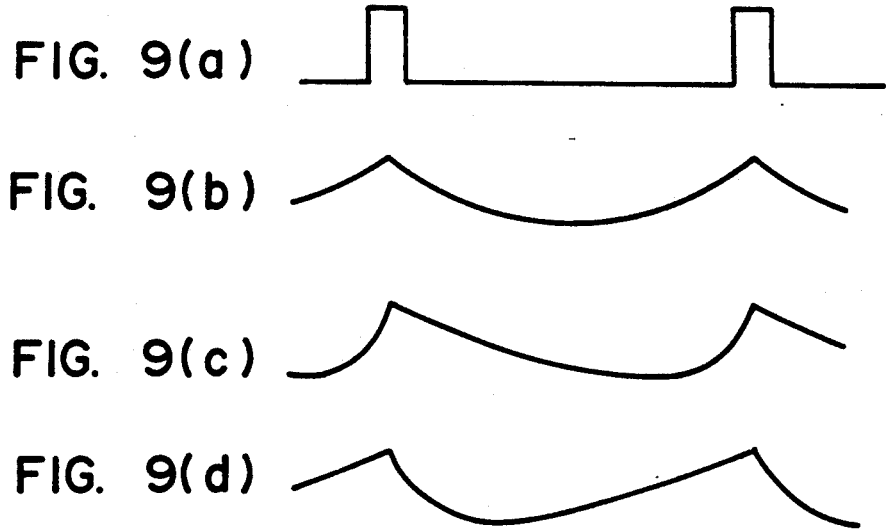
FIGS. 9 (a) through (d) illustrate correction waveforms for various kinds of correction data in the first embodiment.

Firstly, correction of image light from the G projecting optics 56 serving as a reference will be described with reference to FIG. 9, which shows correction waveforms. As shown at (b) in FIG. 8, a G projecting distance 39 defines a region in which the projecting distance from the light source of G projecting optics toward the screen surface is constant and the distance to a screen 54 is longer at the screen peripheral portion than at the screen central portion. The longer projecting distance to the peripheral portion implies that the projection widening ratio, geometrical distortion and focus characteristics at the central portion are different from those at the peripheral portion. Therefore, under the application of a synchronization signal at a horizontal scanning frequency as shown at (a) in FIG. 9, correction data is determined having a basic correction waveform in the form of a horizontal parabolic correction waveform as shown at (b) in FIG. 9 in which the correction amount is larger at the peripheral portion than at the central portion. Based on this correction waveform, the correction amount is computed from the value of converging angle and then geometical distortion and focus correction data are calculated in accordance with the correction amount.

Correction of image light from the side G projecting optics 55 and B projecting optics 57 will now be described. As shown at (d) in FIG. 8, a R projecting distance 37 defines a region in which the projecting distance from the light source of R projecting optics toward the screen surface is constant and the distance to the screen 54 is longer at one peripheral side portion of the screen than at the screen central portion because of the in-line arrangement of the projecting optical system; and similarly, a B projecting distance 38 defines a region in which the projecting distance from the light source of B projecting optics toward the screen surface is constant and the distance to the screen 54 is longer at the other peripheral side portion of the screen than at the screen central portion. Therefore, under the application of the synchronization signal at the horizontal scanning frequency as shown at (a) in FIG. 9, correction data for the R projecting optics are determined having a basic correction waveform in the form of a combined waveform of a horizontal parabolic correction waveform and a horizontal saw-tooth waveform as shown at (c) in FIG. 9 in which the correction amount is larger at the peripheral portion, especially, one side portion than the central portion; and similarly, correction data for the B projecting optics is determined having a basic correction waveform in the form of a combined waveform of a horizontal parabolic correction waveform and a horizontal sawtooth waveform as shown at (d) in FIG. 9 in which the correction amount is larger at the peripheral portion, especially, the other side portion than the central portion. Thus, in the R projecting optics 55, on the basis of the correction waveform as shown at (c) in FIG. 9 effective to provide a larger correction amount at the left end, the correction amount is computed from the value of converging angle and then geometrical distortion and focus correction data are calculated in accordance with the correction amount; and similarly, in the B projecting optics 57, on the basis of the correction waveform as shown at (d) in FIG. 9 effective to provide a larger correction amount at the right end, the correction amount is computed from the value of converging angle and then geometrical distortion and focus correction data are calculated in accordance with the correction data.

Figure 10A:
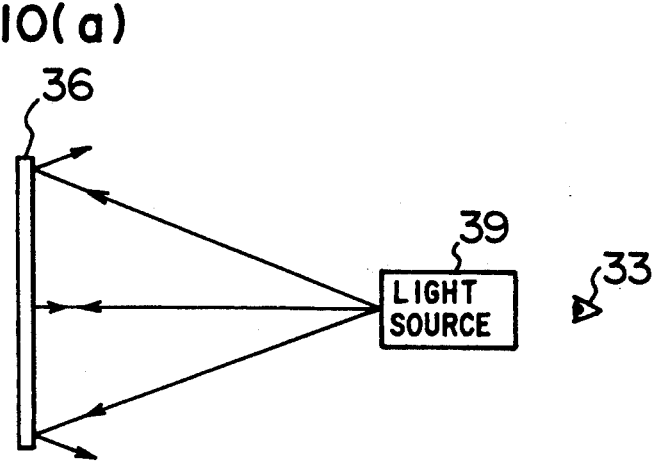
FIGS. 10 (a) through (c) show optical paths useful in explaining the operation of the first embodiment.
Figure 10B:
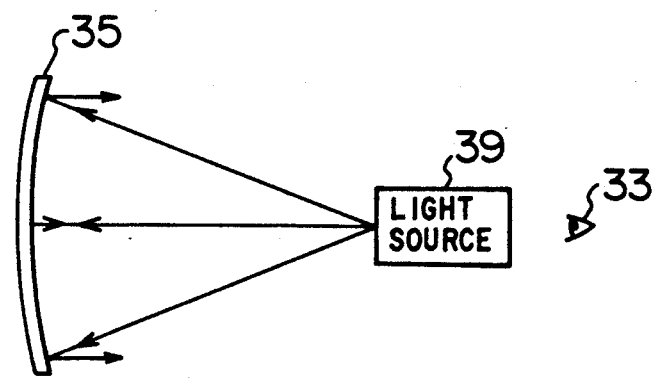
Figure 10C:
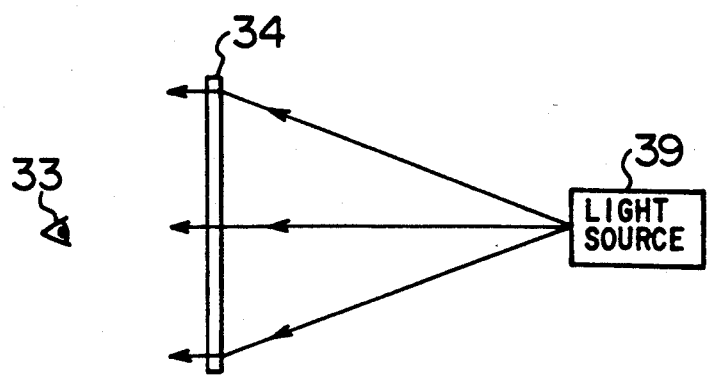

To describe how to calculate correction waveforms in accordance with the curvature of the screen in greater detail, reference should also be made to FIG. 10 showing the construction of the optics. FIG. 10 illustrates optical paths of reflection light which are set up respectively with a reflection type plane screen 36 as shown at (a) in FIG. 10, a reflection type spherical screen 35 as shown at (b) in FIG. 10 and a transmission type plane screen 34 as shown at (c) in FIG. 10. When RGB light from a light source 39 is projected onto the reflection type plane screen 36, as illustrated at (a) in FIG. 10, light incident upon the peripheral portion is reflected outwardly to decrease the luminance at the peripheral portion. When the RGB light is projected onto the reflection type spherical screen 35 as shown at (b), light incident upon the peripheral portion is reflected in a direction parallel to the optical axis, with the result that the reflection light does not impinge upon eyes of an observer 33 and the luminance at the peripheral portion also decreases as in the case of the plane screen at (a). When the RGB light is projected onto the transmission type plane screen 34 as shown at (c), the luminance at the peripheral portion also decreases. Thus, in any of the screens shown at (a), (b) and (c), greater correction amounts of luminance are needed at the peripheral portion than at the central portion and therefore the basic correction waveform has the form of a horizontal parabolic correction waveform as shown at (b) in FIG. 9. Based on this correction waveform, the correction amount is computed from the screen curvature and the value of converging angle and then luminance correction data is calculated in accordance with the correction data.

The RGB projecting optical system of the light source 39 is of in-line arrangement and in the R projecting optics or B projecting optics, a greater correction amount is needed for one peripheral side portion and the basic correction waveform has the form of a combined waveform of a horizontal parabolic correction waveform and a horizontal sawtooth waveform. Thus, in the R projecting optics 55, on the basis of the correction waveform as shown at (c) in FIG. 9 effective to provide a larger correction amount at the left end, the correction amount is computed from the screen curvature and the value of converging angle and then luminance correction data for R color is calculated in accordance with the correction data; and similarly, in the B projecting optics 57, on the basis of the correction waveform as shown at (d) in FIG. 9 effective to provide a larger correction amount at the right end, the correction amount is computed from the screen curvature and the value of converging angle and then luminance correction data for B color is calculated in accordance with the correction data.

As described above, in accordance with the present embodiment, correction is effected by setting the converging angle serving as the basic specification of the projecting optics or by automatically calculating the converging angle from the convergence correction amounts so as to automatically calculate various kinds of corrections, whereby complicated adjustments of the video projector can be eliminated and so the time for adjustment can be reduced.

Figure 11:
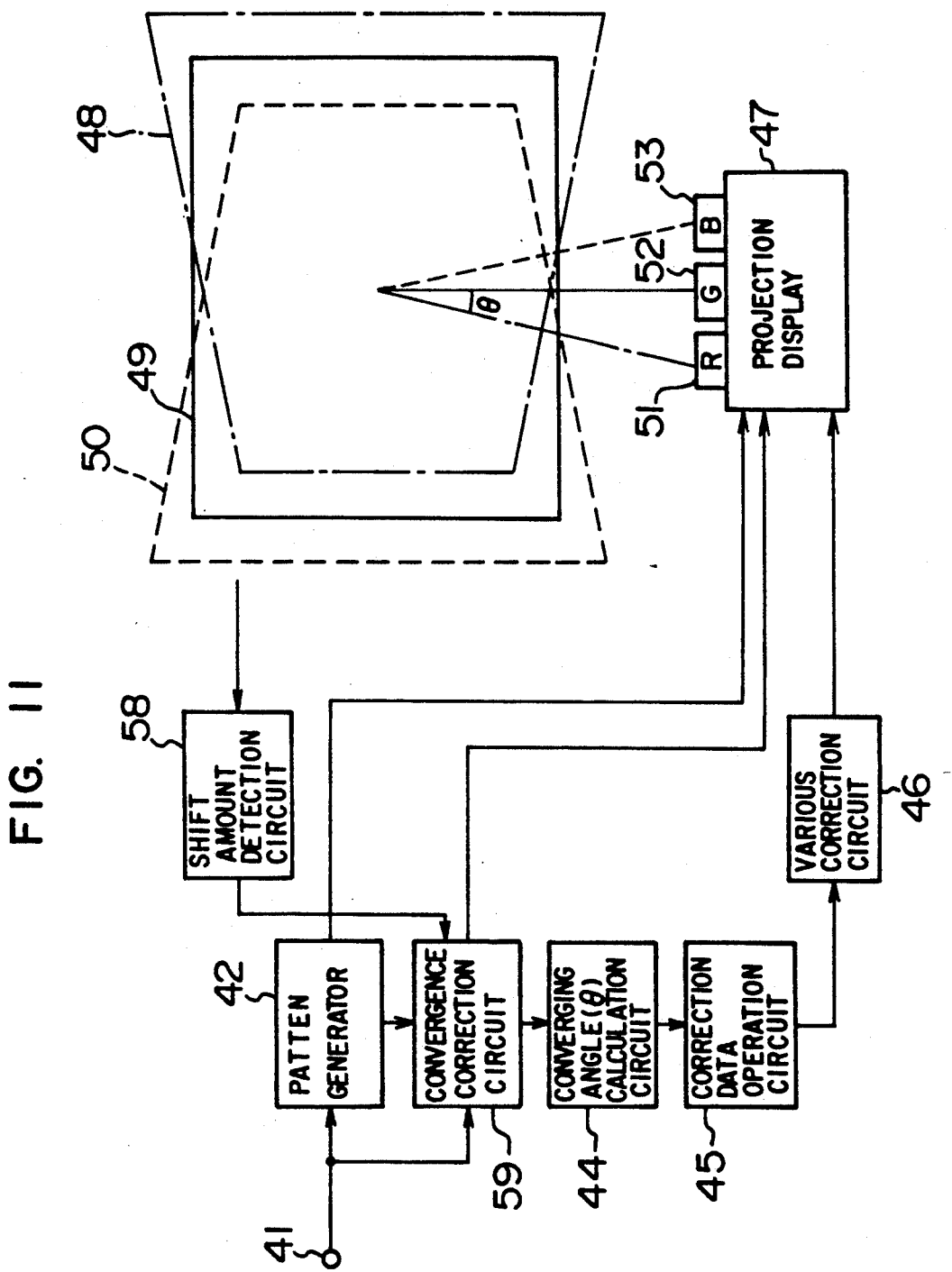
FIG. 11 is a block diagram showing a second embodiment of the image correction apparatus according to the invention.
Figure 12A:
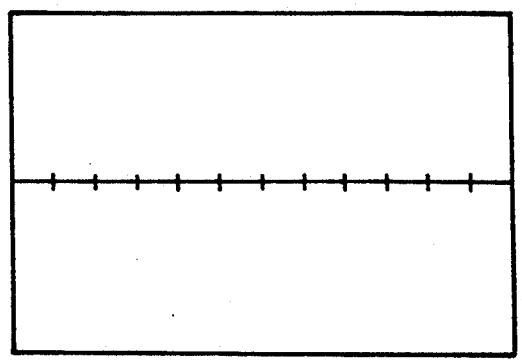
FIGS. 12 (a) through (e) illustrate pictures displayed on the screen and waveforms in the second embodiment.
Figure 12B:
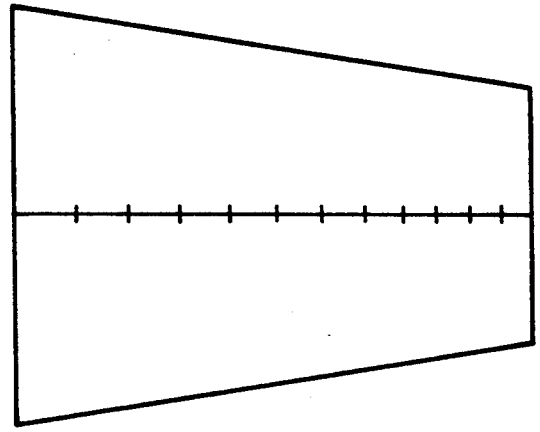
Figure 12C:
Figure 12D:
Figure 12E:

FIGS. 11 to 13 show a second embodiment of the invention. Structurally, the second embodiment differs from the first embodiment in that the convergence shift amount is detected to determine various correction waveforms automatically. Referring to FIG. 11, reference numeral 58 designates a shift amount detection circuit for detecting convergence shift amounts of respective colors in accordance with pattern signals displayed on the screen, 59 a convergence correction circuit responsive to a shift amount detection signal to prepare correction waveforms used for correction. In FIG. 12, components operating equivalently to those of the first embodiment are designated by the same reference numerals and will not be described herein.

FIG. 13 shows display screen pictures and waveforms useful to explain an image correction apparatus of the present embodiment. The shift amount detection circuit 58 shown in FIG. 11 detects signals of respective colors displayed on the screen. For example, FIG. 12 shows at (a) a displayed picture of G signal serving as the reference and at (b) a displayed picture of signals of other colors. These displayed pictures are detected by the shift amount detection circuit 58 to determine the convergence correction amount automatically. When the picture shown at (a) in FIG. 12 is detected by the shift amount detection circuit 58, there results a detection signal in which pattern signals are positioned at equal intervals as shown at (c) in FIG. 12 but when the picture shown at (b) in FIG. 12 is detected, a detection signal is obtained in which pattern signals are positioned at unequal intervals as shown at (d) in FIG. 12. To meet the requirement of convergence, the detection signal shown at (c) in FIG. 12 has to correctly overlap the detection signal shown at (d) in FIG. 12. Therefore, the shift amount detection circuit 58 detects the positional difference between the pattern signals in the detection signals shown at (c) and (d) in FIG. 12 and calculates optimum correction amounts for positional shift correction. The detection and the calculation of correction data may be carried out in a manner described below. The phase difference between the signal serving as the reference and the signal to be corrected for convergence can first be detected by using a counter and then correction data can be calculated easily by the geometrical operation method. Since in this method the waveform for correction of geometrical color aberration in the video projector takes a basic waveform which is a combined waveform of a sawtooth waveform and a parabolic waveform, correction waveforms and correction amounts are calculated in accordance with shift amounts at the screen central portion and the screen peripheral portion. FIG. 13 shows the relation between correction waveform and movement of correction change on the screen. Accordingly, the waveform for correction of the detection signal shown at (d) in FIG. 12 is required to be linear in the horizontal direction, and by correcting the detection signal with a horizontal parabolic waveform, the detection signal at (d) can be brought into in-phase with the detection signal at (c), as can be seen at (e) in FIG. 12. The correction waveform and correction amount detected by the shift amount detection circuit 58 are supplied to the convergence correction circuit 59 to control various waveforms necessary for convergence correction and the controlled waveforms are supplied to the widening projector 47.

As described above, the convergence correction is effected automatically and converging angles of a plurality of projector tubes are calculated from the correction amounts to perform various corrections automatically. With the RGB projector tubes aligned in line as shown at (b) in FIG. 3, light from the projector tube 56 is handled as reference light for right-left symmetrical correction and light of other colors is converged to the G projecting light, thereby making the positional detection easy and realizing highly precise correction. A variety of other correction waveforms can be prepared in a similar manner to the first embodiment and will not be described herein.

As described above, in accordance with the present embodiment, various kinds of corrections can be calculated automatically to perform correction by detecting the convergence shift amount to determine various correction waveforms automatically and calculating the converging angle automatically from the convergence correction amount, thereby ensuring that complicated adjustments of the video projector can be eliminated and the adjustment time can be reduced.

FIGS. 14 to 17 show a third embodiment of the invention. Structurally, the third embodiment differs from the first embodiment in that pattern signals for detection are displayed, shift amounts of a plurality of adjustment points on the screen are extracted from each pattern signal, extracted data is stored digitally and interpolated to determine convergence correction amounts and converging angles are calculated in accordance with the correction amounts.

Figure 14:
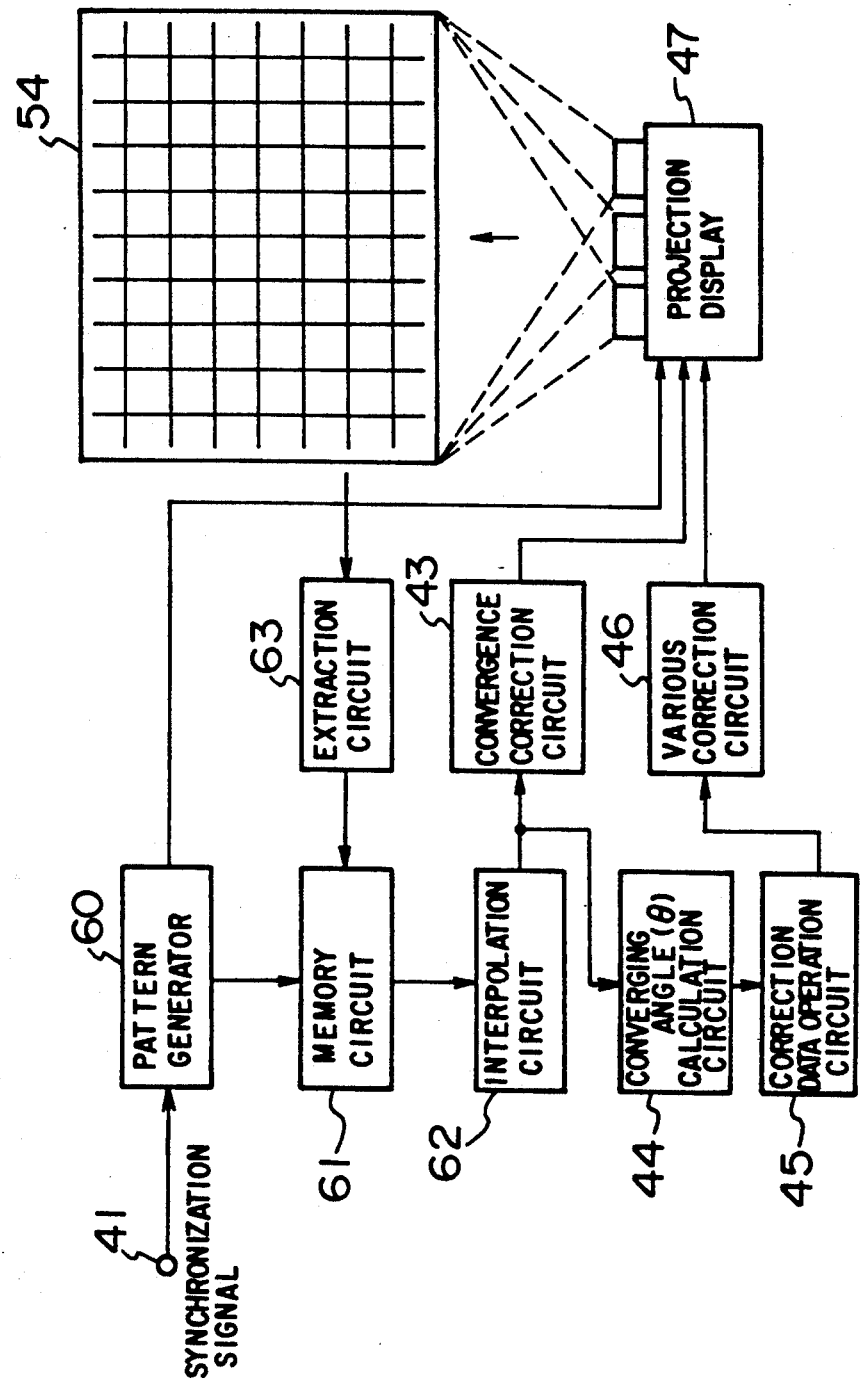
FIG. 14 is a block diagram showing a third embodiment of the image correction apparatus according to the invention.

Referring to FIG. 14, reference numeral 60 designates a pattern generator for generating a plurality of adjustment points in the horizontal and vertical directions to provide various patterns for adjustment, 63 an extraction circuit for extracting shift amounts and change amounts by detecting pattern signals displayed on a screen 54, 61 a memory circuit for storing various correction amounts for extracted adjustment points and 62 an interpolation circuit for determining a correction amount for the entire screen by interpolating correction amounts for adjustment points. In FIG. 14, components operating equivalently to those of the first embodiment are designated by the same reference numerals and will not be described herein.

Figure 15A:
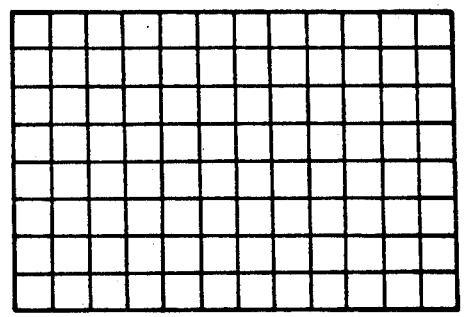
FIGS. 15 (a) and (b) illustrate pattern signals displayed on the screen in the third embodiment.
Figure 15B:
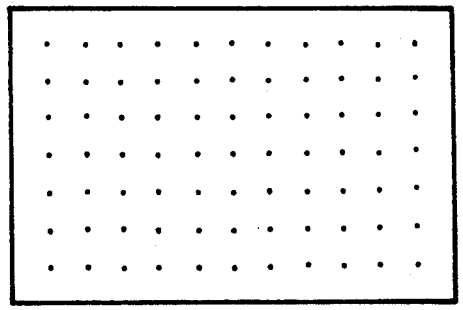
Figure 17A:
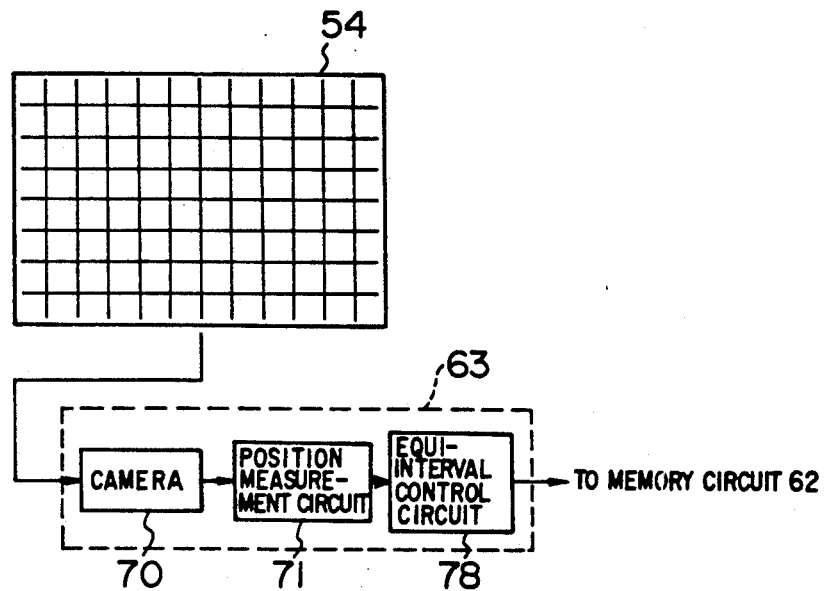
FIG. 17 (a) through (d) illustrate a block diagram of an arrangement used for correction of deflection linearity and diagrams useful to explain the operation thereof in the third embodiment.
Figure 17B:
Figure 17C:
Figure 17D:
Figure 18:
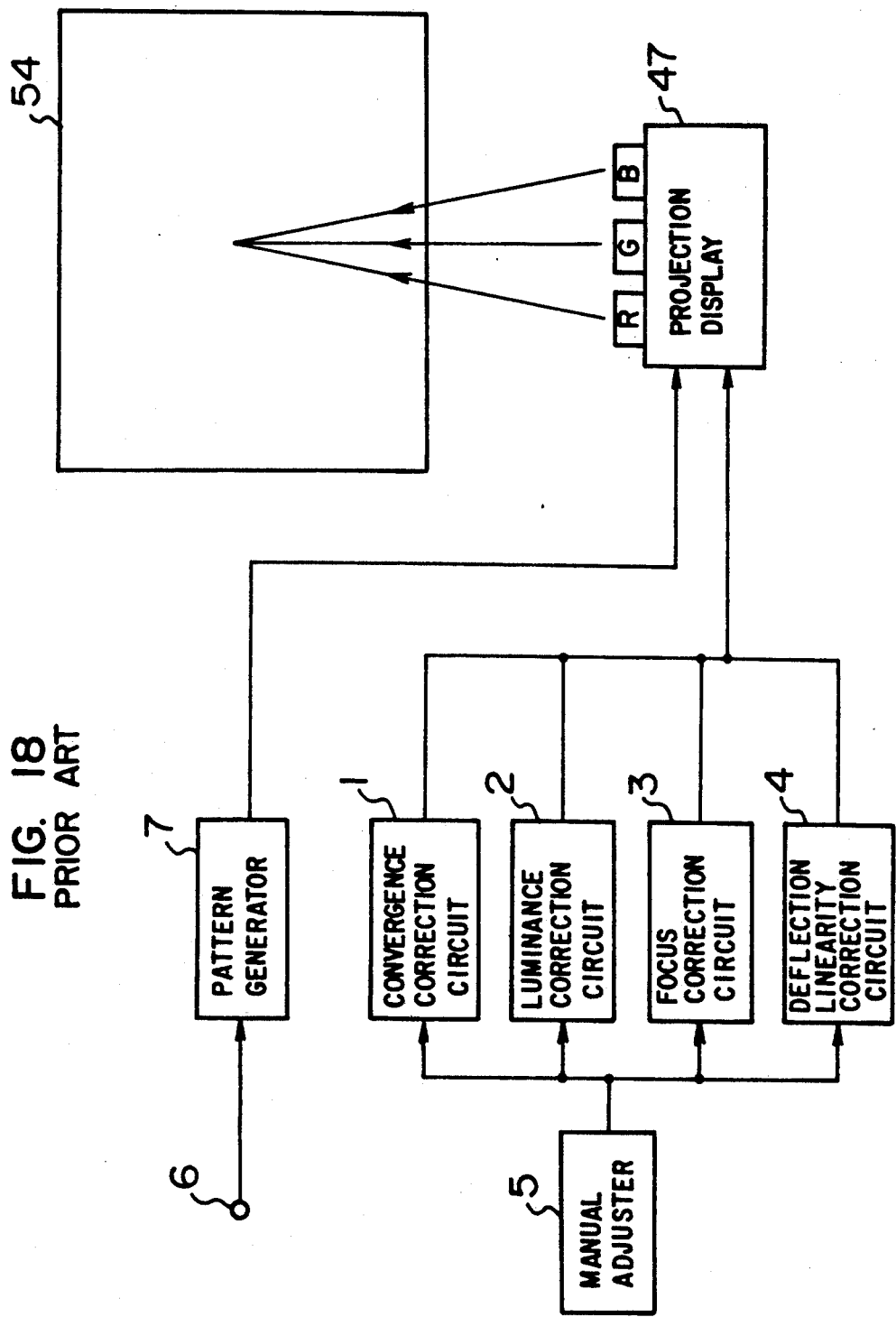
FIG. 18 is a block diagram showing a conventional image correction apparatus in video projector.

The operation of an image correction apparatus constructed as above will now be described. When a synchronization signal is applied to the input terminal 41, the pattern generator 42 generates address signals in association with each horizontal scanning so that adjustment pattern signals suitable for convergence adjustment may be displayed on the screen 54 in accordance with the address signals. For adjustment of convergence and deflection linearity, a crosshatch signal as shown at (a) in FIG. 15 or a dot signal as shown at (b) in FIG. 15 is displayed as the adjustment pattern signals. Light of the pattern signals displayed on the screen 54 is detected by the extraction circuit 63 to extract shift amounts and change amounts. Correction data for each adjustment point extracted by the extraction circuit 63 is supplied to the memory circuit 61 which in turn stores correction data for only representative points. Correction data for the representative points from the memory circuit 61 is supplied to the interpolation circuit 62 to prepare correction data for the entire screen. Interpolation in the horizontal direction is accomplished by data smoothing by means of a LPF which limits the band with a sampling frequency corresponding to the number of adjustment points and interpolation in the vertical direction is accomplished by inter-data calculation such as linear approximation or curve approximation between adjacent adjustment points. The convergence correction data for the entire screen determined by the interpolation circuit 62 is used by the converging angle calculation circuit 44 to calculate a converging angle and the calculated data is supplied to the correction data operation circuit 45 to determine various correction data by computing. The correction data from the correction data operation circuit is supplied through the circuit 46 for various corrections to the projection display 47.

To describe how to perform extraction for convergence correction in greater detail, reference should be made to FIG. 16 showing diagrammatic representations and waveforms. For convergence in high vision apparatus, a correction precision of less than 0.4 scanning line is required. Therefore, pattern signals displayed at adjustment points on the screen are sequentially enlarged and detected to extract shift amounts. As shown at (a) in FIG. 16, an upper-left adjustment point A on the screen 54 is enlarged and detected by means of a camera 70 and a position measurement circuit 71 performs position measurement of a resulting detection signal relative to the reference signal of, for example, G signal to extract a shift amount. The extraction data is supplied to the memory circuit 62 and stored therein. The sequential enlargement by the camera is carried out from the upper-left adjustment point A to an upper-right adjustment point B in the horizontal direction and from the upper adjustment point A to a lower adjustment point C in the vertical direction, thus permitting precise detection of shift amount at each adjustment point. A picture enlarged by the camera 70 is shown at (b) in FIG. 16 and used for convergence of a color signal to be converged as shown at (d) in FIG. 16 to the reference signal position as shown at (c) in FIG. 16. This permits precise convergence correction. As described above, individual adjustment points are sequentially enlarged and detected to extract shift amounts.

To describe in greater detail how to perform extraction when convergence correction for G signal is effected for correction of deflection linearity, reference should be made to FIG. 17 showing a diagrammatic representation and waveforms. Pattern signals displayed on the screen are detected by a camera 70 to provide a detection signal from which pattern signal positions as shown at (b) in FIG. 17 are extracted by means of a position measurement circuit 71. The signal from the position measurement circuit 71 is supplied to an equi-interval control circuit 78, causing the same to determine, through calculation, a correction waveform as shown at (d) in FIG. 17 by which positions of pattern signals at individual adjustment points on the screen can be spaced at equal intervals as shown at (c) in FIG. 17. The correction data is supplied to the memory circuit 62 which in turn stores correction data for deflection linearity at representative points. As described above, positions of pattern signals at individual adjustment points on the screen are detected and correction amounts are extracted by which positions of pattern signals can be spaced at equal intervals.

As described above, in accordance with the present embodiment, pattern signals for detection are displayed, shift amounts at a plurality of adjustment points on the screen are extracted from the pattern signals, correction data at individual adjustment points are digitally stored and interpolated to determine convergence correction amounts, and converging angles are calculated from the convergence correction amounts to determine various kinds of correction data by computing, whereby complicated adjustments of the video projector can be eliminated to reduce the time for adjustment.

The first and second embodiments have been described by way of the video projector for better understanding of the invention but obviously the invention is effective for other types of display apparatus.

The first embodiment has been described by referring to the case where the converging angle standing for the basic specification of the optics is set and calculated to determine various correction waveforms but alternatively all specifications of the optics may be set and determined.

In the second and third embodiments, the detection of pattern signals on the screen has been described as being effected by using the camera but other photoelectric conversion device may be used.

The third embodiment has been described by referring to the case where a plurality of adjustment points are provided on the screen to digitally determine convergence correction but alternatively the screen may be divided into several regions in which analog correction is carried out. The plurality of adjustment points may also be used for other correction than the convergence correction.

As has been described, according to the invention, the converging angle standing for the basic specification of the projecting optics is set, converging angles of a plurality of projector tubes are calculated from convergence correction amounts, correction amounts for deflection linearity, luminance reduction and focus error are determined from the calculated data by computing and individual correction means are corrected automatically in accordance with the computed data, thereby making it possible to eliminate various complicated adjustments. In addition, since the converging angle can be calculated easily by detecting color aberration at only the crucial line and peripheral portion of the screen, the apparatus can be realized with a circuit of simplified scale.

Further, according to the invention, by detecting and automatically correcting color aberration amounts on the screen and determining various correction amounts from the corrected color aberration amounts by computing, the time for adjustment can be reduced to a great extent. Furthermore, by detecting the geometrical shift amount relative to light from the reference projector tube, the converging angle can be calculated easily and an apparatus of a simplified construction can be realized.

Furthermore, according to the invention, by displaying pattern signals for detection, extracting from the pattern signals shift amounts at a plurality of adjustment points on the screen, digitally storing and interpolating correction data for individual adjustment points to determine convergence correction amounts, and calculating converging angles from the convergence correction amounts to determine various correction data through computation, complicated adjustments of the video projector can be eliminated and so the time for adjustment can be reduced.

We claim:

1. An image correction apparatus comprising:
   means for widening projecting and displaying images on a screen by using a plurality of projector tubes;
   means for setting specifications of the projecting optical system of said display means;
   means for determining correction amounts for convergence, deflection linearity, luminance reduction and focus error through computation in accordance with data for converging angles produced from said setting means; and
   means for controlling various correction circuits in a projector unit in accordance with the correction data of various kinds.

2. An image correction apparatus according to claim 1 wherein said setting means sets the picture size such as screen size and aspect ratio, the screen curvature, the lens specification such as projection widening ratio and projecting distance and the converging angle which can be calculated from the arrangement pitch between projector tubes.

3. An image correction apparatus comprising:
   means for widening projecting and displaying images on a screen by using a plurality of projector tubes;
   means for generating and displaying pattern signals for adjustment on said screen;
   means for correcting convergence on said screen;
   means for calculating converging angles of said plurality of projector tubes in accordance with convergence correction amounts;
   means for determining correction amounts for deflection linearity, luminance reduction and focus error through computation in accordance with calculated data; and
   means for controlling various correction circuits in a projector unit in accordance with the correction data of various kinds.

4. An image correction apparatus according to claim 3 wherein said calculation means calculates the converging angles of said projector tubes in accordance with color aberration amounts at the crucial line and peripheral portion of the screen.

5. An image correction apparatus comprising:
means for widening projecting and displaying images on a screen by using a plurality of projector tubes;
means for generating and displaying pattern signals for adjustment on said screen;
means for correcting convergence on said screen;
means for calculating converging angles of said plurality of projector tubes in accordance with convergence correction amounts at the crucial line and peripheral portion of the screen;
means for determining correction amounts for deflection linearity, luminance reduction and focus error through computation in accordance with calculated data; and
means for controlling various correction circuits in a projector unit in accordance with the correction data of various kinds.

6. An image correction apparatus comprising:
means for widening projecting and displaying images on a screen by using a plurality of projector tubes;
means for generating and displaying test signals for convergence adjustment on said screen;
means for detecting convergence shift amounts on said screen;
means for calculating converging angles of said plurality of projector tubes from convergence correction amounts in accordance with detection signals;
means for determining correction amounts for deflection linearity, luminance reduction and focus error through computation in accordance with calculated data; and
means for controlling various correction circuits in a projector unit in accordance with the correction data of various kinds.

7. An image correction apparatus according to claim 6 wherein said detection means detects a geometical shift amount relative to reference light from a reference projector tube.

8. An image correction apparatus comprising:
means for widening projecting and displaying images on a screen by using a plurality of projector tubes;
means for generating and displaying test signals for convergence adjustment on said screen;
means for detecting convergence shift amounts on said screen from geometical shift amounts relative to reference light from a reference projector tube;
means for calculating converging angles of said plurality of projector tubes from convergence correction amounts in accordance with detection signals;
means for determining correction amounts for deflection linearity, luminance reduction and focus error through computation in accordance with calculated data; and
means for controlling various correction circuits in a projector unit in accordance with the correction data of various kinds.

9. An image correction apparatus comprising:
means for widening, projecting and displaying images on a screen by using a plurality of projector tubes;
means for generating and displaying test signals on said screen for convergence adjustment having a plurality of adjustment points in the horizontal and vertical directions;
means for detecting convergence shift amounts at the adjustment points on said screen;
means for determining correction data for the entire screen from correction data for said adjustment points through interpolation;
means for calculating converging angles of said plurality of projector tubes in accordance with convergence correction amounts;
means for determining correction amounts for deflection linearity, luminance reduction and focus error through computation in accordance with calculated data; and
means for controlling various correction circuits in a projector unit in accordance with the correction data of various kinds.

10. An image correction apparatus comprising:
means for widening, projecting and displaying images on a screen by using a plurality of projector tubes;
means for setting specifications of the projecting optical system of said display means, said specifications including the picture size such as screen size and aspect ratio, the screen curvature, the lens specification such as projection widening ratio and projecting distance, and the converging angle which can be calculated from the arrangement pitch between projector tubes;
means for determining correction amounts for convergence, deflection linearity, luminance reduction and focus error through computation in accordance with data for converging angles produced from setting means; and
means for controlling various correction circuits in a projector unit in accordance with the correction data of various kinds.

* * * * *